US010604328B2

(12) United States Patent
Barton (10) Patent No.: US 10,604,328 B2
(45) Date of Patent: Mar. 31, 2020

(54) THERMOFORMED FLEXIBLE STAND-UP DISPENSING PACKAGE WITH INTEGRAL POUR SPOUT

(71) Applicant: Barton Group, Inc., East Hampton, NY (US)

(72) Inventor: Lewis Barton, Wainscott, NY (US)

(73) Assignee: BARTON GROUP, INC., East Hampton, NY (US)

( * ) Notice: Subject to any disclaimer, the term of this patent is extended or adjusted under 35 U.S.C. 154(b) by 0 days.

(21) Appl. No.: 16/146,027

(22) Filed: Sep. 28, 2018

(65) Prior Publication Data
US 2019/0100373 A1  Apr. 4, 2019

Related U.S. Application Data (60) Provisional application No. 62/565,876, filed on Sep. 29, 2017, provisional application No. 62/596,382, filed on Dec. 8, 2017.

(51) Int. Cl.
| B65D 83/00 | (2006.01) |
| B65D 75/00 | (2006.01) |
| B65D 75/32 | (2006.01) |
| B65D 75/58 | (2006.01) |
| B29C 51/36 | (2006.01) |
| B29L 31/00 | (2006.01) |
| B29K 101/12 | (2006.01) |

(52) U.S. Cl.
CPC ......... B65D 83/0055 (2013.01); B29C 51/36 (2013.01); B65D 75/008 (2013.01); B65D 75/326 (2013.01); B65D 75/5822 (2013.01); B65D 75/5866 (2013.01); B29K 2101/12 (2013.01); B29L 2031/712 (2013.01)

(58) Field of Classification Search
CPC ............................ B65D 90/00; B65D 83/0055
USPC ........... 222/107, 211, 541.9, 541.6; 220/501, 220/505, 694, 23.4; 215/46–50; 206/528, 530, 532, 538, 539, 534.1, 206/534.2, 820, 216, 229
See application file for complete search history.

(56) References Cited

U.S. PATENT DOCUMENTS 4,209,096 A * 6/1980 Carkhuff .............. B65D 75/366
206/469
4,301,926 A * 11/1981 Chung ............... B65D 77/2052
222/107

(Continued)

Primary Examiner — Vishal Pancholi
(74) Attorney, Agent, or Firm — Abelman Frayne & Schwab (57) ABSTRACT

A highly flexible thermoformed stand-up dispensing package for a flowable material that is produced from one or more highly flexible heat-sealable polymeric sheets is formed with a trapezoidal front wall and opposing back wall and is dimensional and configured so that the corner of the package formed by the intersection of the top and the projecting side wall, or walls, that extend at an obtuse angle from the base is removable along a weakened tear line that is positioned upon removal to provide an integral pour spout for the controlled dispensing of the flowable material; and the container portion of the package is dimensioned to (1) maintain the center of gravity of the flowable material in the package over the base wall when the base wall of the filled package is in contact with a horizontal surface, and (2) to maintain the level of flowable material in the opened package is below the opened integral pour spout.

19 Claims, 8 Drawing Sheets

(56) References Cited

U.S. PATENT DOCUMENTS

| | | | |
|---|---|---|---|
| 4,798,324 A | | 1/1989 | Gannon |
| 5,529,224 A | * | 6/1996 | Chan .................. B65D 75/58 |
| | | | 222/107 |
| 5,839,609 A | * | 11/1998 | Zakensberg ........... B65D 75/32 |
| | | | 222/107 |
| 6,085,942 A | * | 7/2000 | Redmond .............. B29C 51/08 |
| | | | 222/107 |
| 6,149,006 A | * | 11/2000 | Brauner ................ B65D 1/22 |
| | | | 206/232 |
| 8,381,941 B2 | | 2/2013 | Barton |
| 8,430,266 B2 | | 4/2013 | Barton |
| 8,511,500 B2 | * | 8/2013 | Teys .................... B65D 43/162 |
| | | | 220/265 |
| 8,844,757 B2 | * | 9/2014 | Wilmers ............. B65D 75/326 |
| | | | 220/608 |
| 9,187,225 B2 | | 11/2015 | Barton |
| 9,758,284 B2 | | 9/2017 | Barton |
| 10,000,325 B2 | | 6/2018 | Barton |
| 10,059,498 B2 | | 8/2018 | Barton |
| 2007/0164045 A1 | * | 7/2007 | Wydler ............... B65D 75/5866 |
| | | | 222/106 |
| 2007/0228073 A1 | * | 10/2007 | Mazzarino ......... B65D 75/5811 |
| | | | 222/107 |
| 2009/0301923 A1 | * | 12/2009 | Van Puijenbroek ..... B65D 1/22 |
| | | | 206/518 |
| 2010/0270330 A1 | * | 10/2010 | Caldwell ........... B65D 21/0202 |
| | | | 222/107 |

\* cited by examiner

THERMOFORMED FLEXIBLE STAND-UP DISPENSING PACKAGE WITH INTEGRAL POUR SPOUT

FIELD OF THE INVENTION

The present disclosure is directed to an improved thermoformed flexible dispensing package produced from highly flexible heat-sealable webs or sheets of polymeric material that is configured for the controlled manual dispensing of liquids, viscous fluids and flowable solid materials which will maintain a stable upright position after opening when placed on a horizontal surface.

BACKGROUND OF THE INVENTION

Among the simplest configurations of flexible plastic dispensing containers are single-serve portions of various condiments such as ketchup, mustard and soy sauce for which the user is required to first find a position along the edge of, or adjacent to the narrow end of the rectangular package which will yield to being torn downwardly or transversely to dispense the contents of the package. In some instances, and particularly where the contents are not at all viscous, but rather are highly flowable as is the case with soy sauce, the difficulty is not in only tearing the package at the narrow end, but also in attempting to dispense a small portion so that the flow can be controlled. Failure to achieve the desired result can lead to the uncontrolled discharge of the soy sauce from the package and onto the hand or hands of the user and/or the adjacent area. The contents can also continue to drain from the package after it has been opened and placed on a horizontal surface since it cannot assume an upright or stand-up position. Common experience indicates that the performance of this type of single-serve flexible packaging is often unsatisfactory.

Flexible packages that are mass produced from webs and sheets of flexible polymeric material with various forms of dispensing tubes are known in the art, and include the dispensing packages for flowable fluids described in U.S. Pat. Nos. 8,381,941 and 8,430,266, the disclosures of which are incorporated in their entirety by reference. Several embodiments of a beverage dispensing package that is thermoformed using sheets or webs of highly flexible polymeric material and having an integral straw for withdrawing the liquid contents by the user are disclosed in U.S. Pat. No. 9,187,225, the disclosure of which is also incorporated herein in its entirety by reference.

As will be understood by those familiar with the art, the term web is intended to refer to a material of defined width and indefinite length, e.g., a roll of polymeric film that can be mounted on a transverse roller and dispensed essentially continuously from a station at one end of a forming machine. A sheet can be cut from a web and fed manually or by automated means to form a prescribed number of units.

A method and system of the prior art for producing a package with an integrally formed supporting base for use in a stand-up configuration will be briefly described with reference to FIG. 1 and the apparatus (100). It will be understood that the steps illustrated are performed on a web or a sheet of highly flexible polymeric material that has properties that make it suitable for thermoforming. Suitable materials are well-known to those of skill in the art and are those highly flexible polymeric webs and sheets that can be heat-sealed as required to define a fluid-tight seal. The manufacturing process can be performed continuously for the mass production of the filled packages.

The package blank is defined as an area of a roll or web consisting of a top or cover section and a corresponding bottom section of a separate web defining the vacuum thermoformed container, where the bottom sections are continuously advanced to a position above the thermoforming station of the automated machine. For convenience and in the interest of clarity, the mold (101) is shown in solid lines positioned below the bottom sheet (103). It will also be understood that the bottom sheet assumes the corresponding configuration during the subsequent steps. In the embodiment illustrated, the bottom section passes below a heating station (114), is heated and thereby softened to facilitate the thermoforming step, which includes the application of a vacuum via lines (112) and, optionally, the use of a male plug assist (not shown) to fully form the container portion (120). This step can include the forming of dissimilar side walls, i.e., to provide an asymmetrical package configuration. The thermoformed container portion is filled with contents "F" at station (142) from a container (140) via a pair of fill tubes (143) before the top sheet or web 150 is positioned and sealed around its entire periphery at a sealing station (154) that includes a heated platen schematically represented by peripheral arrows (155). The sealed packages (160) are separated, e.g., by a guillotine knife (170) to provide individual flexible dispensing packages (162), the longitudinal edges of which are optionally trimmed by cutting wheels (180).

Figure 1:
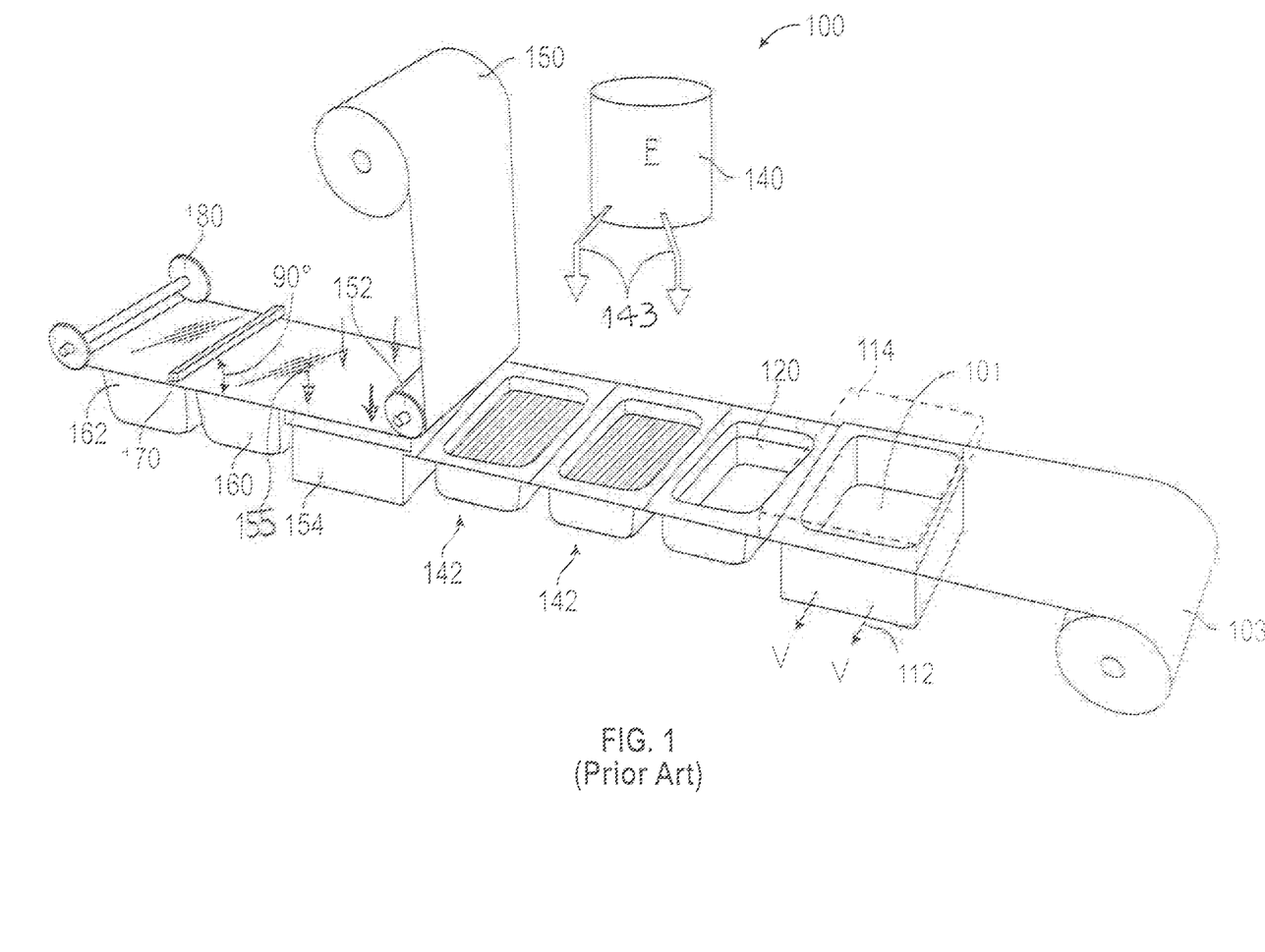
FIG. 1 is illustrative of an HTFFS machine of the prior art with a single mold with a generally rectilinear cavity and a guillotine knife positioned at 90° to the longitudinal direction of travel to separate the filled and sealed packages.
Figure 10:
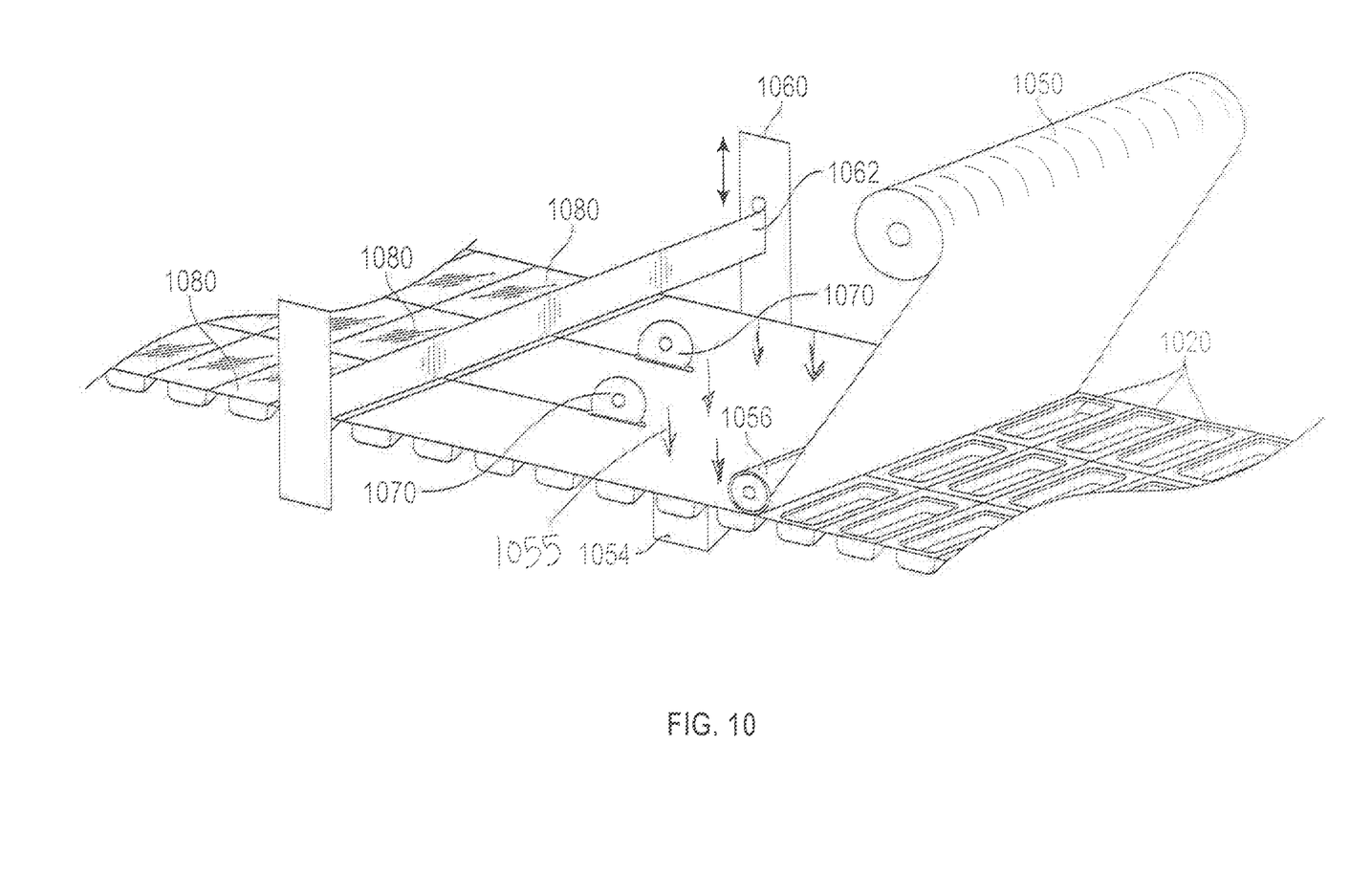
FIG. 10 is a simplified schematic illustration of an HTFFS machine fitted with a trapezoidal mold for producing packages in a parallelogram configuration showing a single guillotine blade at an angle, e.g., of 65 to the longitudinal direction of travel and a pair of conventional rotary slitting blades for edge trimming the web to define the top and base peripheries of the finished package.

In the interests of clarity, the production line of FIG. 1 is shown in a so-called one-up configuration. It will be understood that two or more parallel production lines can advantageously be combined to increase the rate of production of the filled package from a pair of webs of appropriate width, e.g., as schematically illustrated in FIG. 10 which will be described in detail below.

As will be understood by those familiar with the art, one aspect of the economics of mass producing flexible packages from heat-sealable webs of flexible polymeric material is the ability to minimize the number of steps required to complete the production of the finished package. This is an important factor even in fully-automated package forming and filling operations such as those utilizing horizontal thermoform-fill-seal ("HTFFS") machines which are well known in the packaging industry. This is an important factor because each step involves a mechanical operation performed by one or more machines at stations along the production line. If a machine fails, either entirely or moves out of adjustment or alignment during a high-speed production run, then many units of the item being produced on the line will be lost, the entire line must be shut down, a mechanic brought in to first diagnose the problem and then repair the defect in as short a period of time as possible or, alternatively, remove the particular machine or component and replace it with a back-up part or unit.

One step employed in the mass production of thermoformed dispensing packages is the die-cutting operation that is commonly required to form the dispensing tube. Examples of packaging that require die-cutting after the container portion of the package has been filled with the flowable material and heat-sealed around the periphery to define the shape of the final package are shown in U.S. Pat. Nos. 9,187,225 and 8,430,266, the disclosures of which are incorporated herein by reference in their entirety. For example, in the '225 patent, FIGS. 1C and 1D schematically illustrate the die-cutting step after the package has been filled. The various embodiments of the finished package illustrated in the series of FIGS. 6-6G illustrate finished shapes which require a die-cutting step. Specific reference is made to FIG. 6F where the molds are placed in abutting relationship to minimize the waste, leaving a central section (681) of the multiple webs that must be remove by die-cutting. Similar configurations are illustrated in FIGS. 1 and 5 of the '266 patent.

One problem addressed by the present disclosure is the production of a flexible thermoformed dispensing package which permits the user to dispense all or a predetermined portion of the package contents with some precision and without spilling due to lack of control, and that requires no die-cutting following the production and sealing of the package to remove waste material.

This disclosure also addresses the problem of providing a thermoformed flexible dispensing package that is configured and dimensioned to provide a high degree of control in the hands of the user during the dispensing of the contents, whether they be liquid or a pourable solid, e.g., a powder or granular material. This control extends to both the ease of handling the container while it is open and also to the control of the volume and rate of flow of the contents through the dispensing opening.

Another problem addressed is providing a flexible thermoformed dispensing package of simplified construction that is easy to open and which will maintain a stable stand-up orientation on a horizontal surface after opening that will avoid unintentional discharge of especially liquid contents.

A further problem addressed is providing a flexible thermoformed dispensing package that can be produced using highly flexible, light weight webs or films of polymeric materials which will retain its flowable contents after the package has been opened for dispensing and the package is placed on a horizontal surface.

SUMMARY OF THE INVENTION

Figure 3:
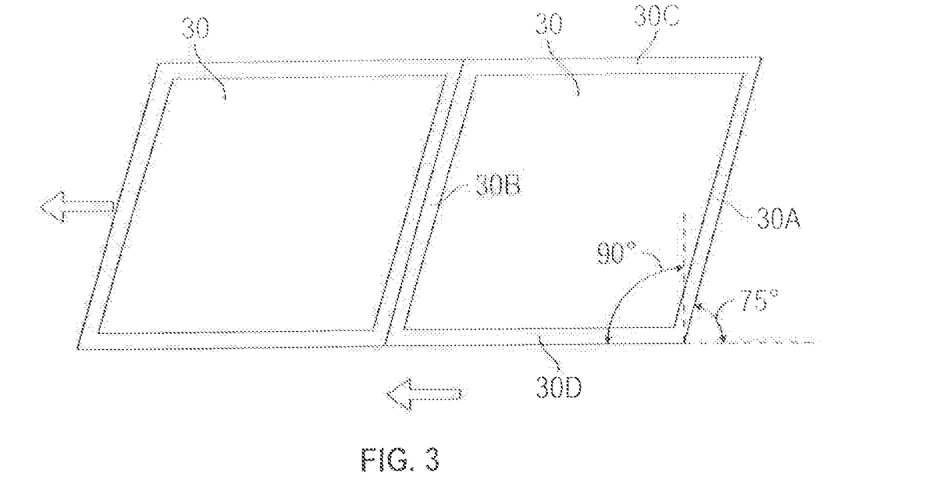
FIG. 3 is a top or plan view of a series of two (2) packages thermoformed by the mold prior to separation with the parallelogram cavity shown in FIG. 2.

The above problems are resolved and further advantages are provided by a thermoformed highly flexible dispensing stand-up package having trapezoidal front and rear walls extending upwardly from a generally rectangular base wall and a pair of tapered opposing side walls joined to the front and rear walls that extend upwardly to the top wall to complete the sealed package. At least one of the side walls extends at an included obtuse angle from the base wall to project outwardly so that the intersection of the projecting side wall with the top wall of the package defines a pour spout at the extended corner. See, e.g., FIG. 4 which is described in detail below. The opposing side wall extends upwardly from the base wall to the top wall at an angle that can be complimentary to the obtuse angle of the projecting side wall, thus forming a parallelogram as shown in FIG. 3, or at an angle that is in the range defined by the complimentary angle and an included angle to the base wall of about 120°, or even greater. The side wall opposite the projecting wall can be perpendicular to the base, i.e., intersecting the base wall at a 90° angle.

In an embodiment, the projecting pour spout includes a weakened tear line that defines an opening of predetermined size when the free end is removed. The size of the opening of the spout following removal of the corner along the tear line is predetermined by the intended use of the package and its contents. One or both ends of the tear line that is formed in the sealed periphery of the portion of the pour spout can be notched to facilitate the manual separation of the free end, typically between the user's thumb and forefinger. The tear line can be weakened by providing fluid-tight perforations and other techniques known in the art.

The highly flexible package can be dimensioned and configured for a single use in which the entire contents of the package are dispensed and the empty package discarded. The use can also be defined as one in which a portion of the contents are to be dispensed and the package is to be set aside in an open condition, e.g., on a horizontal supporting surface so that the remaining flowable contents are securely retained inside as a result of the stability of the highly flexible packaging which expanding over the supporting base wall results in a lowering of the center of gravity of the contents and the package itself. Where the dispensing package of the disclosure contains a liquid, e.g., a dosage form of a medication or a beverage, e.g., milk, the user can insert a drinking straw into the opening, or the user can tip the dispensing package and pour some or all of the contents directly into her mouth.

The tapered side walls can be trapezoidal or triangular extending upwardly from the base wall. In the embodiment where the opposing side walls are triangular, the top wall is defined by a line or seam. As will be apparent to those of ordinary skill in the art and from the description below, the configuration of the top wall is determined by the shape of the mold used to produce the package. The decision to form the dispensing package with a top wall of specified dimensions, or as a seam or line that joins the tops of the front and rear trapezoidal walls is predetermined based on aesthetic and/or real or perceived functional considerations. Like factors can be relied upon to determine the angle defined by the base and the side wall opposite the projecting wall. For example, the larger the obtuse angle, the smaller will be the angle formed with the top wall. Thus, a larger obtuse angle at the base will result in a narrower end of the dispensing portion and the ability to control the volume of e.g., liquid contents by placement of the manual tear line closer to the periphery, i.e., to permit more precise dropwise dispensing.

From the above, it will be understood that the present disclosure is directed to a dispensing package configured in the form of a parallelogram or trapezoid in which the supporting base wall and the opposing top wall are generally parallel, and at least one of the opposing side walls is offset at an angle greater than 90° to create a projecting wall terminating in a narrow tip or a point at the leading edge of the top wall or the line formed by the sealing together of the top edges of the trapezoidal walls. This configuration provides a natural and efficient structural feature from which to dispense the flowable contents when provided with a notched tear line or further enhanced by forming an imbedded spout in the heat-sealed projection. This dispensing structure creates value by providing a precision dispensing spout without the additional cost of providing the package with a separate molded plastic fitment, cap or an added external spout, and without the die-cutting of the finished package.

As will be apparent from the above description and illustratively in the attached drawings which will be described in detail below, the trapezoidal profile of the filled package when placed on a horizontal shelf or other surface, e.g., a store shelf at the point of sale, visually suggests a stylized pitcher or container having a pour spout extending laterally from the body of the package. Graphic indicia preprinted on the web or sheets of thermoformable polymeric films used to form the package can serve to enhance the suggestive form and to make it clear to the purchasers and users that the package does in fact function as a dispenser from which the contents can be poured, as from a pitcher, a teapot or other like utensil. The packaging can also include graphics to illustrate the dispensing of the contents directly into the user's mouth or by inserting a separate straw into the open end of the package. The package can also be marked to indicate the volume based upon the level at which the liquid contents appear when the opened package is placed on a horizontal surface.

The projecting corner or tip of the thermoformed flexible package can include an imbedded spout which extends through the peripheral seal of the package and in communication with the container portion and through the tear line, so that upon removal of the end of the corner, the contents can be dispensed in a controlled manner through the imbedded spout. In accordance with techniques well known in the art, the spout can be small enough so that the contents are dispensed in drop-sized portions, or as a fine stream that can be dispensed by squeezing the package.

In an embodiment, the dispensing package of the disclosure is configured as a trapezoid in which each of the side walls forms an obtuse included angle with the base wall resulting in opposing projecting walls terminating in a narrow tip, or point. The container portion is provided with an interior wall that defines two separate fluid-tight compartments.

In a specific embodiment, this disclosure is directed to a highly flexible thermoformed stand-up dispensing package for a flowable material, the package produced from one or more highly flexible heat-sealable polymeric sheets, the package comprising:

a. a bottom sheet thermoformed into a container portion that includes a recessed chamber having a trapezoidal bottom wall and integrally formed opposing side walls, a top wall and a base wall parallel to the top wall, where at least one of the side walls forms an included obtuse angle with the base wall, the chamber being bounded by an outwardly extending peripheral area, the chamber being configured and dimensioned to receive the flowable material, and b. a top cover sheet superposed on, and heat-sealed to the periphery of the bottom sheet to form a trapezoidal front wall, wherein the opposing side walls are generally trapezoidal or triangular and the narrow end of the trapezoid or the apex of the triangle defines the top wall of the recessed chamber, and the opposite end of each of the side walls defines the base wall, the base wall being dimensioned to maintain the center of gravity of the flowable material in the package over the base wall due to the deformation of the highly flexible walls under the outward force of the flowable material when the base wall of the filled package is in contact with a horizontal surface, and where a predetermined portion of the corner of the package formed by the intersection of the top wall and the projecting side wall that extends at an obtuse angle from the base is removable to provide an opening to dispense the flowable material in the package.

In one embodiment, the improved mold of the present disclosure comprises a mold body that is dimensioned and configured for installation and integration for use in a horizontal thermoformed-fill-seal (HTFFS) machine for mass producing a flexible thermoformed dispensing package for a flowable material. This disclosure broadly comprehends a mold that is dimensioned and configured for integration and use in a molding machine for mass producing a highly flexible thermoformed dispensing package for a flowable material, the mold having a cavity defining a container portion, the opening of the cavity bounded by a planar peripheral margin extending horizontally a predetermined distance outwardly from the cavity opening, the peripheral margin being dimensioned to receive in heat-sealing relation a highly flexible thermoplastic top sheet sealed to a thermoformed highly flexible bottom sheet that lines the mold and overlies the peripheral margin of the mold during use to produce the thermoformed package, the container portion configured with:

a trapezoidal bottom wall that is upwardly inclined from the horizontal from a bottom edge to a top edge, the top and bottom edges being parallel, a first side edge intersecting the bottom edge at an obtuse angle and an opposing second side edge extending between the top and bottom edges to define a straight line, a base wall extending vertically from the bottom edge of the bottom wall, opposing first and second side walls extending vertically from the respective first and second side edges of the trapezoidal bottom wall, and intersecting the base wall at an included acute angle, the side walls tapering from the base wall toward the inclined end of the trapezoidal bottom wall, a top wall extending between the tapered ends of the side walls and along the top edge of the inclined end of the trapezoidal bottom wall The mold can include channels extending from the interior surface of the cavity through the mold walls to the exterior surface for engagement with appropriate fittings to create a vacuum below a bottom sheet positioned over the cavity during use.

In another aspect, the present disclosure is directed to an improved method for the continuous mass production of the thermoformed flexible dispensing packages described above, and to molds for use, e.g., in the HTFFS production machines. The improved mass production method includes the steps of providing either a single mold, or a plurality of molds positioned in adjacent relation with the parallel sides of the molds aligned longitudinally on the bed of the production machine.

In accordance with the conventional operating steps of the prior art HTFFS machine, some of which were described above with reference to FIG. 1, a bottom web of highly flexible heat-scalable thermoplastic material is positioned above the end of the production line machine and the web is retained in alignment by moving clamps on the sides of the machine while the web is drawn, e.g., by vacuum, into the mold cavity to thermoform the container portion with the remaining section of the surrounding web forming the periphery. A plug assist can also be used to facilitate formation of the container and, optionally, also the formation of a groove in the extended peripheral corner of the projecting wall portion to form an imbedded spout, if this feature is to be included.

Thereafter, the formed container portion is withdrawn from the mold cavity and moved longitudinally to the production line filling station where the flowable contents are measured into the container portion, and thereafter to the lidding station where the top cover sheet or web is superposed on, and heat-sealed to the periphery of the bottom sheet using conventional means known in the art. The sealed package is next conveyed to the separation station where a transverse cut is made, preferably by a guillotine knife or blade which is positioned at an angle transverse to the direction of movement that corresponds to the angular orientation of the side walls of the package. In an embodiment of the dispensing package in which the side walls form a parallelogram as illustrated in FIG. 10, the diagonally positioned guillotine knife will separate both sides of the package from an adjacent package without a change in its angular orientation. In those embodiments where the side walls of the dispensing package are not parallel, but rather are at different angles to the base, a second guillotine knife stationed with the blade at the appropriate angle corresponding to the opposing side wall can be advantageously employed at the separation station. Alternatively, a single guillotine knife can be provided with an automated mechanism to change the angle mechanically for each cut by movement of one or both ends to correspond to the respective side wall angles.

As will be understood by those familiar with the art, this mode of operation using a guillotine knife or other cutting device, e.g., a shuttle or flying rotary knife or straight blade knife to effect the angular transverse lines of separation is accomplished without the additional step of die-cutting. It will be understood that marginal slitting wheels can be provided to trim the excess top cover and bottom webs along the sealed peripheral edges to form clean and uniform top and base seams of the peripheral regions of the finished package. Again, as will be understood by those familiar with the art, the waste generated in this final trimming operation can be minimized by appropriate selection of the width of the top cover web and the bottom web that is drawn into the thermoformed container portion.

As noted above, the practice of the methods using the molds configured in accordance with this disclosure, and the packages thereby produced advantageously utilize the manufacturing system or apparatus known as Horizontal Thermo-form/Fill/Seal (HTFFS) package production. This method of production can be utilized with commercial packaging machines made by a number of firms including Multivac Inc. at 1 1021 N Pomona Avenue, Kansas City, Mo.; Harpak-ULMA Packaging, LLC at 175 John Quincy Adams Road, Taunton, Mass. 02780; Reiser at 725 Dedham Street, Canton, Mass.; and others. These and other packaging machine manufacturers and distributors in the U.S. and outside of the U.S. have posted animations at their respective websites that illustrate a variety of prior art methods and systems for producing thermoformed packages, blister packs, and the like. A typical informational posting for such packaging machines manufactured by Harpack-ULMA is found at ulmapackaging.com.

The highly flexible polymeric packaging materials or films preferably used as the bottom sheets from which the container portion is formed and the cover sheet that seals the packages can have the same or can have different properties. In the HTFFS process, the films or webs are referred to as the top and bottom sheets. The bottom film is drawn horizontally from a mill roll across the die, or the forming tool which is maintained at a forming station on the bed of the apparatus. The film is heated to render it pliable and when in position across the die, it is drawn into the die by a vacuum. In accordance with techniques well known to the prior art, this forming process is optionally assisted by a heated male plug that serves to press the pliable bottom film into the die to assure that the desired contour is achieved. As it is drawn into the die, the polymeric material conforms to the shape of the die in all dimensions, creating a matching recessed chamber.

In all cases, the polymeric packaging film or films employed are highly flexible, so that the filled and sealed package readily deforms under the influence of gravity when the base of the package is placed on a horizontal surface. The result of the deformation of the highly flexible packaging material is to both lower the center of gravity of the package and to provide a free head space between the top of the contents and the sealed seam or top wall of the package.

Webs and sheets of polyethylene have been found to be suitable for thermoforming a package of the desired high degree of flexibility in the finished filled package that will readily deform under the gravitational effect on the flowable contents. The polyethylene employed for the top layer can be of a gauge, expressed in mils, of 4 mils and suitable results can be achieved employing a film having a gauge in the range of from 1.5 mils to 10 mils. The bottom sheet can be 5 mils, and a useful range is from 3 mils to 15 mils. For example, a particular range of mil thickness can be appropriate for use with a pharmaceutical product that can be expected to be packed and handled somewhat more carefully than milk, yogurt and juices that are prepared for distribution to schools and other institutions.

Copolymers of ethylene, as well as other polymers and copolymers known in the art can be used based on specific properties and characteristics desired or required for the particular package fill material. As will be apparent to those familiar with the packaging art, economics will also be a factor in choosing a particular polymer and/or its thickness.

In an embodiment where the novel dispensing package is not resealable, it is eminently suited for dispensing its contents as a single portion, or as multiple portions soon after opening. Applications can include commercial, industrial and food services products where the contents have a relatively short shelflife and will be dispensed in their entirety or discarded within a prescribed useful life.

The present invention offers an improvement over the current standard gusseted bottom stand-up package, many of which must be provided fitments and spouts to create a dispensing feature. The flexible packages of the present disclosure can also achieve cost advantages compared to the standard gusseted package because the flat bottom creates a greater volumetric capacity in a package of the same size, i.e., height and width, thereby requiring less packaging material for the same volume of fill.

As explained above, no die-cutting is necessary and production can be accomplished on a contract basis on readily available and relatively lower cost horizontal thermoform-fill-seal machines capable of high rates of production as compared to gusseted packages. The productivity of horizontal thermo-form/fill/seal machines can achieve high volume throughput that can exceed that of the standard gusset package production rates.

The present invention has the potential market opportunities and applications for free-flowing liquid products as well as free-flowing dry products such as beans, rice, nuts, granola, candies and confections, e.g., chocolate chips, chocolate sprinkles, jelly beans, and the like; dishwasher soap, powder and liquid detergents in premeasured quantities, soup, gravy and sauce mixes; powdered soap, bath crystals, bubble bath, and the like; kitty litter and marbles constitute just a few of the products that can advantageously be marketed in the flexible dispensing packages of this disclosure.

BRIEF DESCRIPTION OF THE DRAWINGS

The various features and aspects of the present disclosure will be described in more detail below and with reference to the attached drawings in which like or similar elements are identified by the same reference numbers, and where:

FIGS. 11A-11D are simplified schematic elevation illustrations of conventional transverse cutting knives of the prior art that are suitable for use in the practice of the invention.

DETAILED DESCRIPTION OF THE PRODUCTION METHOD AND APPARATUS

As noted above, the present disclosure provides an improved method for mass producing a flexible dispensing package having an integral highly functional pour spout for the controlled dispensing of liquids and other flowable materials without the need for die-cutting. Utilizing a plurality of molds, each having a cavity of novel trapezoidal configuration that can be arranged in an adjacent array on the bed of an HTFFS machine so that after forming of the container portion, the filled and sealed packages can be separated from the web by a single transverse guillotine cutting blade of novel configuration, and a plurality of longitudinal cutting wheels arranged conventionally to trim the outside edge margins of the webs and to separate a plurality of longitudinally extending packages.

Figure 2:
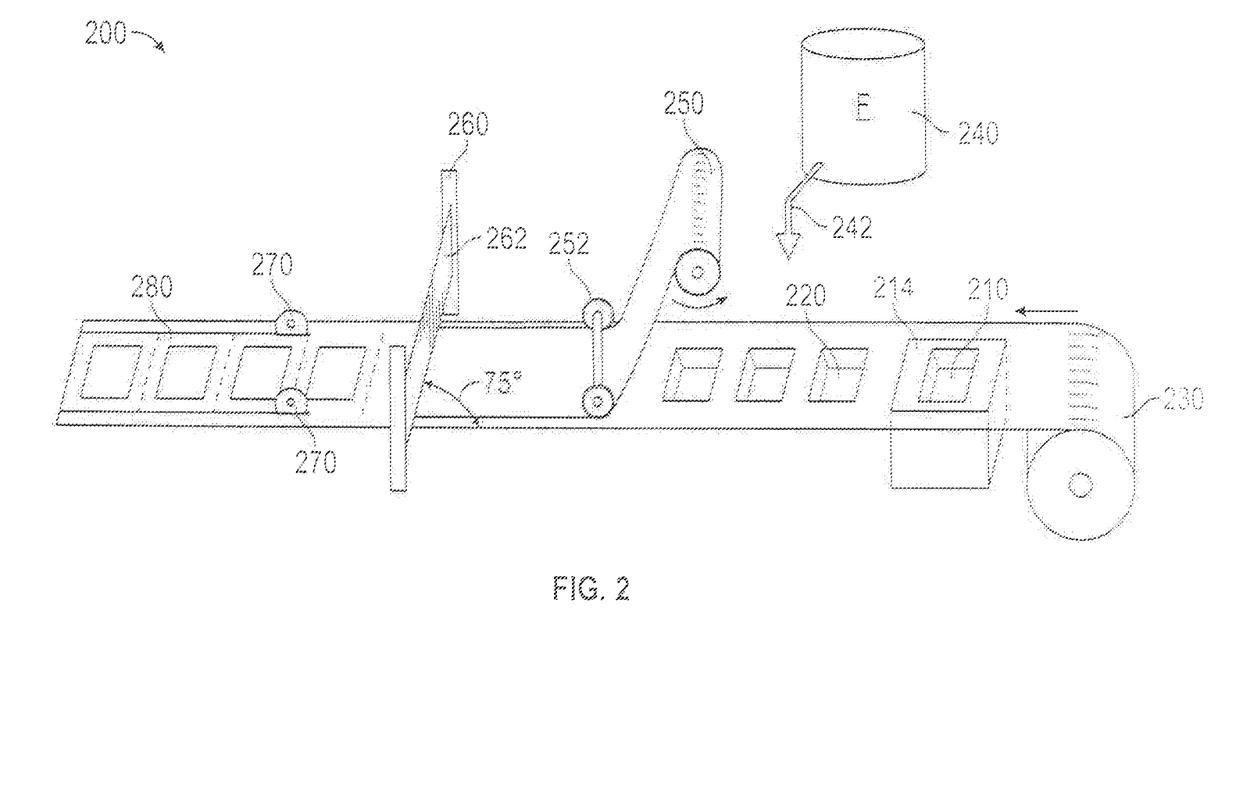
FIG. 2 is an illustration of an HTFFS machine similar to that shown in FIG. 1 which is fitted with a single mold having a trapezoidal cavity in the form of a parallelogram in accordance with the present invention and a transverse guillotine blade mounted at an angle that is acute to the longitudinal axis of the bed which corresponds to the angle of the side walls to the base of the package.

Reference is made to FIG. 2 which schematically illustrates an apparatus (200) similar to that described in detail above with reference to FIG. 1 operating with a single vacuum mold (210). The transverse guillotine cutter (260) with blade (262) extends across the bed of the machine at an angle of 75°. If multiple molds are employed, e.g., a 3-up production line, as described in more detail in conjunction with FIG. 10, the machine can alternatively be provided with a plurality of blades that corresponds to the number of longitudinal molds. As will be understood by one of ordinary skill in the art, each blade cuts through the periphery of the heat-sealed web that defines the marginal area between the filled and sealed longitudinally extending packages moving down the bed of the HTFFS machine following their forming and removal from the cavities of their respective molds. Because the opposite parallel side walls of the trapezoidal container portion are oriented with the longitudinal axis of the machine bed and the direction of travel of the web(s), the guillotine blade, or blades, must be oriented at the angle, or angles defined by the side walls of the trapezoidal package. Blades suitable for use in separating the filled and sealed packages are illustrated and described in detail below in the labeled simplified schematic representations of FIGS. 11A-11D.

Referring to the embodiment of FIG. 3, where the package (30) has the configuration of a parallelogram, the orientation of the leading and trailing edges of the packages (30A, 30B) are at the same angle, e.g., 75° as illustrated, and the remaining side walls (30C, 30D) are parallel to the longitudinal axis of the machine. In the embodiment illustrated in FIG. 4 in which the side wall (40B) opposite the projecting wall (40A) that defines the pour spout are at different angles, i.e. 75° and 90° as illustrated, the side walls are not parallel, and the alternating guillotine cuts must be at different angles. e.g., between adjacent side walls (40B and 42A). The cutting can be accomplished by two separate blades (not shown), each oriented at the desired angle. The apparatus supporting the blades can lower the blades sequentially as the web of sealed packages passes a cutting station on the bed of the machine in response to a programmed processor and controller. Alternatively, the blades can be mounted on the same supporting structure (not shown) and lowered simultaneously to separate the lead and trailing side walls of the passing package in a single movement.

In a further alternative, the apparatus supporting the guillotine blade assembly (260) includes, for example, an automated oscillating mechanism (not shown) that changes the angular orientation of a single pivotally-mounted blade to first cut the side wall that defines the pour spout and then moves to the angle of the opposing side wall as it passes below at the cutting station. Other mechanisms for moving the blade to predetermined positions will be apparent to those of ordinary skill in the art.

Figure 4:
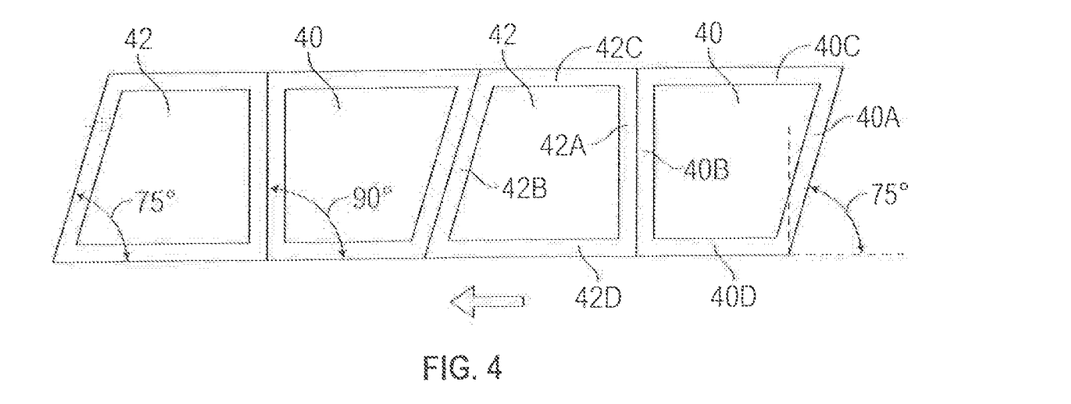
FIG. 4 is a top or plan view of four (4) packages thermoformed in a mold having a pair of inverted mirror image trapezoidal cavities in which two of the walls are not parallel.
Figure 5:
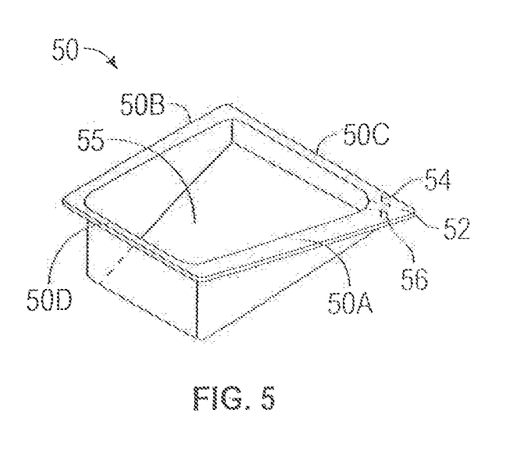
FIG. 5 is a perspective view of the container portion of a package thermoformed in one of the molds configured as illustrated in FIG. 4 following its removal from the mold cavity.

The package (50) illustrated in FIG. 5 corresponds generally to the configuration of the trapezoids shown in FIG. 4. The pour spout is formed in the upper corner (52) by the projecting wall (50A) and top wall (50C). As shown, the corner portion (52) is formed with an integral imbedded pour spout (56) that is in fluid communication with the interior (55) of the container portion of the package (50) and terminates within the heat-sealed periphery of the package. A weakened tear line (54), illustratively shown as perforations, extends across the pour spout (52) to facilitate manual removal of the exterior portion of corner (52) to permit the controlled dispensing of the flowable contents of the package.

Figure 6:
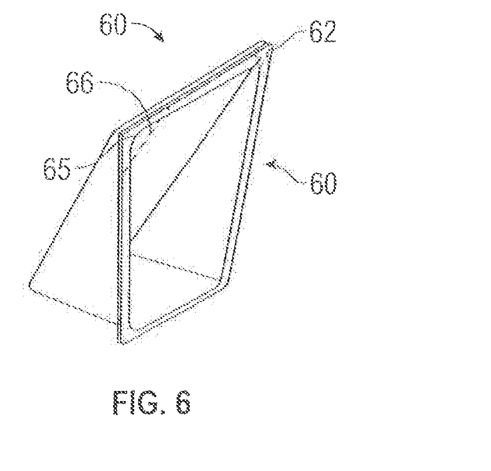
FIG. 6 is the container portion of FIG. 5 rotated to a vertical position with the projecting side wall and pour spout to the right.

FIG. 6 illustrates a package (60) having a configuration similar to that of FIG. 5 described above that has been moved to an upright or standing position. The projecting corner (62) is provided with an imbedded pour spout and weakened tear line as described in FIG. 5, but for convenience, are not shown. The package is also provided with a weakened tear line (66) in the opposite upper corner which extends over the container portion of the package (60) to facilitate the rapid dispensing of the contents of the package.

Figures 7, 8:
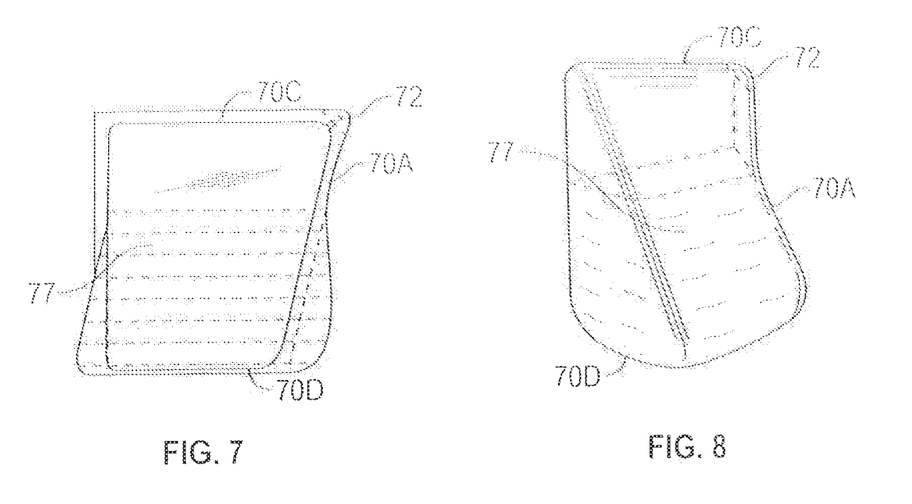
FIG. 7 is a front elevation view of the completed sealed package filled with a liquid supported on a horizontal surface illustrating the deformation and expansion of the lower portion of the highly flexible package and showing the head space above the liquid fill line that is below the region in which the tear line is positioned.
FIG. 8 is a perspective view of the package of FIG. 7.

Illustrated in FIGS. 7 and 8, respectively, are a front perspective view and a front and left side perspective view of a trapezoidal package (70) with projecting wall (70A) and top wall (70C) in which the flowable contents (77) have caused the walls to expand and thereby lower the center of gravity when the base (70D) is placed on a horizontal surface. More specifically, FIG. 7 is illustrative of the filled package as it would appear supported by the mold in which the trapezoidal container portion was produced, while FIG. 8 is representative of the natural configuration that will be assumed by the highly flexible package and its contents under the influence of gravity when positioned for sale or during use.

Figure 9A:
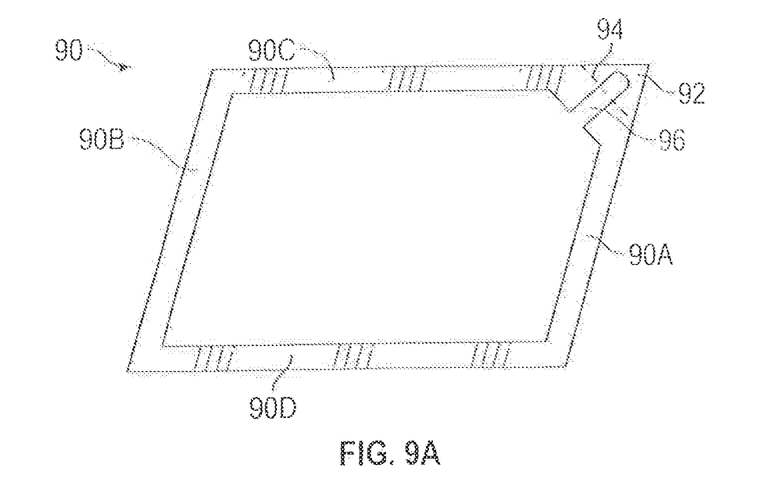
FIG. 9A is a simplified top plan view of a thermoformed package configured as a parallelogram in which an imbedded spout has been formed by a corresponding groove in the extended seal portion of the mold periphery providing a fluid communication channel to the interior of the container portion.
Figure 9B:
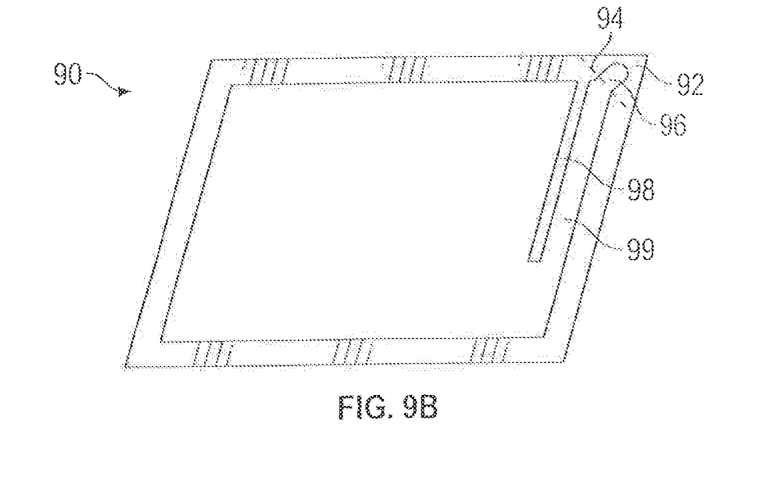
FIG. 9B is a package configures as is in FIG. 9A which includes an interior wall that forms a channel to control the flow to the imbedded spout.

FIGS. 9A and 9B are enlarged top plan views of two embodiments of a heat-sealed package (90) in which the projecting wall (90A) and top wall (90C) form a projecting corner (92) that has been provided with an imbedded pour spout (96) and a weakened tear line (94) as was described above in conjunction with FIG. 5.

In the alternative embodiment of FIG. 9B, the container portion of the package (90) also includes an interior wall (98) that extends from the top wall parallel to the projecting side wall (90A) and is heat-sealed to the cover or lidding of the package in accordance with methods known in the art. The interior wall (98) forms a channel (99) of predetermined cross-section which further controls the flow of, e.g., a liquid of low viscosity through the open imbedded pour spout (96) following removal of the exterior portion of the corner portion (92) along the tear line (94).

In the embodiment of FIG. 10, a production run of packages (1020) configured as parallelograms in a three-up array is shown after filling, with the lidding (1050) being positioned by guide roller (1056) and sealed to the container portion at the heat-sealing station (1054) in conjunction with pressure applied to the periphery of the upper surface by heated platens schematically represented by arrows 1055. Slitting wheels (1070) separate the container from the web longitudinally, and transverse cutting bar (1060) raises and lowers the guillotine (1062) that is angularly aligned with the side walls to separate the parallelogram packages (1080).

Figure 11A:
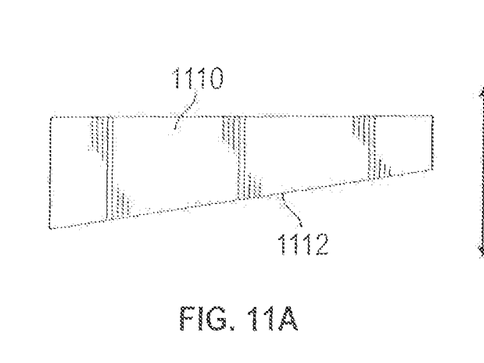
FIG. 11A—straight guillotine knife, FIG. 11B—serrated or serial guillotine knife, FIG. 11C—shuttle or flying rotary knife, and FIG. 11D—shuttle or flying straight blade knife.

Referring now to the series of FIGS. 11A-11D, there are shown highly simplified illustrations of four types of cutting devices known in the art that are suitable for use in the practice of the invention. FIG. 11A is a single guillotine blade (1110) that is tapered along the cutting edge (1112) to facilitate penetration at one side of the edge of the heat-sealed polymer webs used to form the container portion and cover or lidding.

Figure 11B:
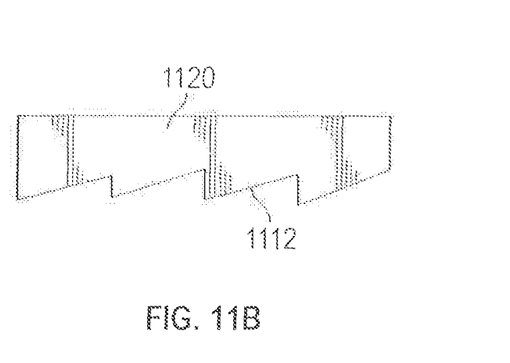

In an alternative configuration schematically illustrated in FIG. 11B, the cutting edge (1122) of blade (1120) has four serrations that are configured to facilitate penetrating the web simultaneously at four locations, thereby reducing the vertical displacement of blade (1120) to completely sever the adjacent packages.

Figure 11C:
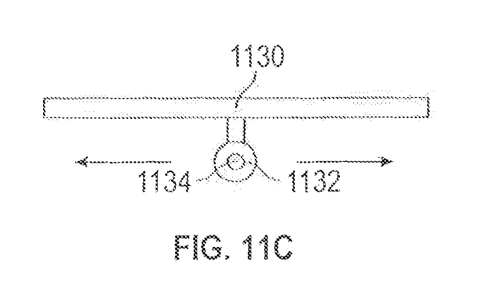

Referring now to FIG. 11C, there is illustrated a transverse supporting bar (1130) that is configured to carry a shuttle or flying cutting wheel (1132) that is mounted on an axis (1134) for rotation while oscillating across the bed of the machine generally transverse to the direction of movement of the sealed packages.

Figure 11D:
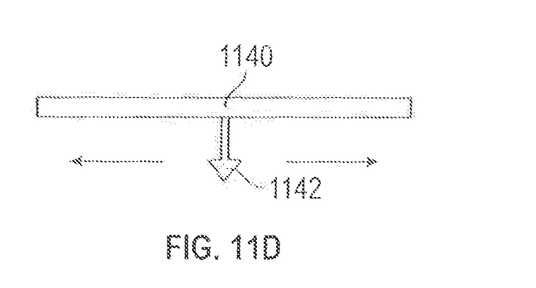

A shuttle or flying straight cutting knife is shown in FIG. 11D with a supporting bar (1140) that carries double-edged knife (1142) that can cut in both directions as the knife oscillates across the web of completed packages.

In preferred embodiments, the cutting edges of each of the devices is periodically or continuously sharpened by automated means in order to assure that the packages are cleanly severed from the adjacent packages, and along the marginal edges of completed packages before leaving the production machine.

Figure 12:
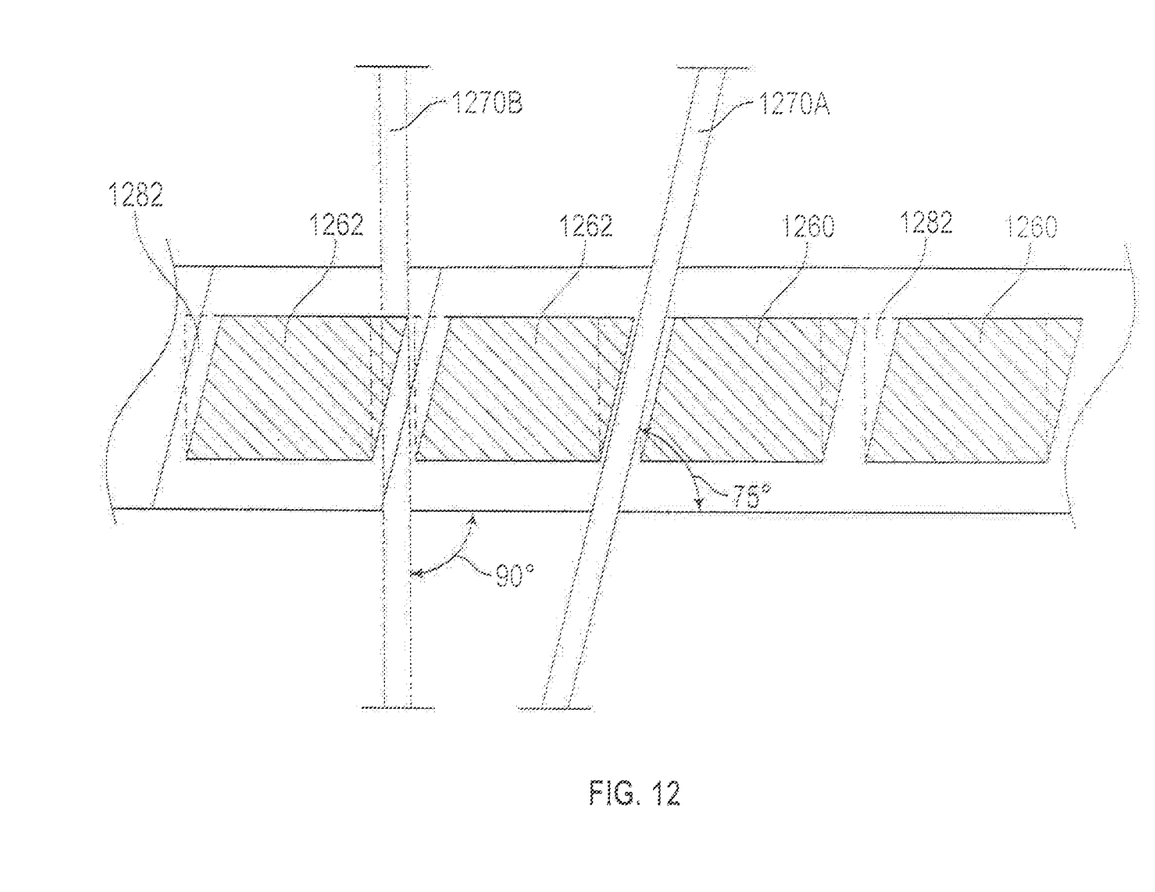
FIG. 12 is a simplified comparative top plan view of a production line illustration of a second knife shown in phantom for producing a dispensing package of the prior art in which the side walls form a 90° angle with the base.

Referring now to FIG. 12, a simplified comparative schematic illustration is provided of a transverse cutting bar (1270) nominally positioned at an angle of 75° to separate filled and sealed containers (1260) shown in shading to provide separated packages (1262). Also shown for comparative purposes only, and to distinguish the method from the prior art, rectilinear containers (1280) are shown in broken lines on the web following heat-sealing to be severed by transverse cutting bar (1270B), also shown in broken lines, to produce the rectilinear separated package (1282) at the end of the production line.

It will also be understood that the cutting station will have blades positioned above the bed of the machine that are dimensioned and configured to correspond to the size and layout of molds at the vacuum forming station.

Figure 13:
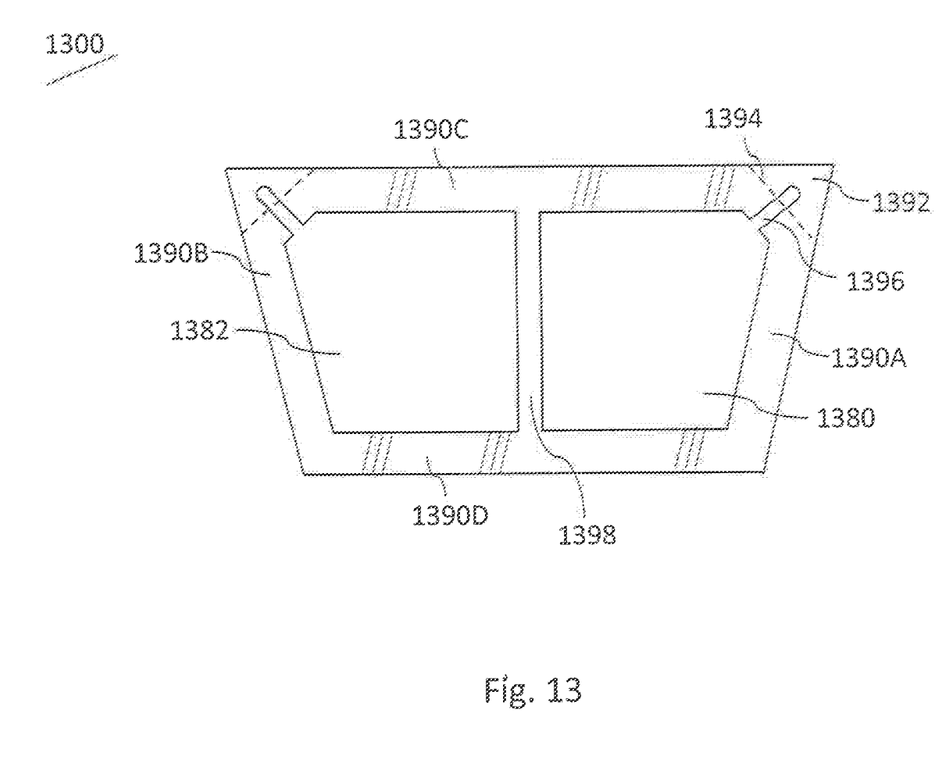
FIG. 13 is a simplified top plan view of a thermoformed package configured as a parallelogram with a pair of opposing pour spouts defined by the top wall and the opposing side walls and an intermediate generally vertical interior wall extending between the top and base walls and from the bottom wall to the cover sheet to form two separate compartments.

Referring now to the simplified plan view of the embodiment of FIG. 13, the thermoformed dispensing package is configured with opposing projecting side walls (1390A, 1390B) each of which form an obtuse included angle ($\alpha$, $\alpha'$) with the base wall (1390D) so that opposing projecting top corners are formed. The angles formed with the base can be the same or different. In the embodiment shown, the top corners are configured with optional imbedded dispensing spouts (1396) and weakened tear lines (1394). With the removal of one of the corners (1392) to provide an opening to the interior of the chamber or container portion, the opposite projecting top corner can be manually gripped. e.g., between the thumb and forefinger of the user to further facilitate control during dispensing.

In an alternative configuration also illustrated in FIG. 13, an interior partition wall (1398) that extends between the base wall (1390D) and top wall (1390C) and from the bottom wall to a heat-sealed contact with the top cover sheet defines two separate compartments (1380, 1382). In this embodiment, each of the projecting corners (1392) can be removed, e.g., as along the optional weakened tear lines (1392), to provide an opening to the compartments (1380, 1382) for dispensing of the flowable contents of the package. As in previously described embodiments, one or both of the projecting top corners can be provided with an embedded dispensing spout (1396) to permit precise and controlled dispensing of the contents from each of the compartments. This configuration has particular utility where a product, such as an epoxy resin or a medication must be compounded from two components that must be maintained separately until the time of use when they are mixed.

Other aspects and features of the flexible dispensing package of the disclosure as described in conjunction with the above embodiments can be incorporated in the embodiment illustratively depicted in FIG. 13.

The present invention has been described in detail above and in the attached drawings and additional modifications and embodiments will be apparent to those of ordinary skill in the art from this disclosure, and the scope of protection for the invention is to be determined by the claims that follows.

The invention claimed is:

1. A highly flexible thermoformed stand-up dispensing package for a flowable material, the package produced from one or more highly flexible heat-sealable polymeric sheets, the package comprising:
   a. a bottom sheet thermoformed into a container portion that includes a recessed chamber having a trapezoidal bottom wall and integrally formed opposing side walls, a top wall and a base wall parallel to the top wall, where one of the side walls forms an included obtuse angle with the base wall and the other side wall is normal to the base wall or is parallel to the opposing side wall, the chamber being bounded by an outwardly extending peripheral area, the chamber being configured and dimensioned to receive the flowable material, and
   b. a top cover sheet superposed on, and heat-sealed to the periphery of the bottom sheet to form a trapezoidal front wall,
wherein the opposing side walls are generally trapezoidal or triangular and the narrow end of the trapezoid or the apex of the triangle defines the top wall of the recessed chamber, and the opposite end of each of the side walls defines the parallel base wall, the base wall being dimensioned to maintain the center of gravity of the flowable material in the package over the base wall due to the deformation of the highly flexible walls under the outward force of the flowable material when the base wall of the filled package is in contact with a horizontal surface, and where a predetermined portion of the corner of the package formed by the intersection of the top wall and a projecting side wall that extends at an obtuse angle from the base is removable to provide an opening to dispense the flowable material in the package.

2. The package of claim 1, where the side walls are triangular and the top wall is a line defined by the interior edge of the adjacent sealed peripheral area.

3. The package of claim 1 in which the side walls are parallel, and the bottom wall defines a parallelogram.

4. The package of claim 1 which includes a weakened tear line that extends at an acute angle between the top wall and the projecting side wall within the heat-sealed periphery of the package.

5. The package of claim 4 in which the portion of the package that lies outside of the tear line forms part of the heat-sealed periphery of the package.

6. The package of claim 5 in which an imbedded dispensing spout extends in fluid communication with the container portion and through a portion of the heat-sealed periphery to terminate at a position external to the tear line.

7. The package of claim 4 in which the portion of the heat-sealed periphery adjacent either end of the tear line is notched to facilitate removal of the corner of the package along the tear line.

8. The package of claim 1 in which the side wall opposite the projecting side wall that extends at an obtuse angle from the base wall forms a right angle with the base wall.

9. The package of claim 1 in which the obtuse angle is in the range from 105° to 135°.

10. The package of claim 1 which includes an interior wall that extends from the top wall parallel to the projecting side wall, the interior wall terminating at a position spaced apart a predetermined distance from the base wall and heat-sealed to the top cover sheet to form a dispensing channel of predetermined cross-section.

11. The package of claim 1 in which the projecting side wall terminates in a curvilinear portion adjacent the top wall.

12. The package of claim 1 in which both side walls form an included obtuse angle with the base wall and the package includes an interior wall that extends from the top wall to the base wall at a predetermined position intermediate the side walls and is heat-sealed to the top cover sheet to thereby divide the container portion into separate sealed compartments.

13. The package of claim 12 in which both corners of the projecting side walls are removable along tear lines to form separate pour spouts.

14. The package of claim 12 in which the obtuse angles formed by the opposing side walls are the same.

15. The package of claim 13 in which the corners of the projecting side walls have an imbedded spout.

16. The package of claim 4 in which the weakened tear line is dimensioned and configured to provide an opening that will pass a drinking straw.

17. The package of claim 12 in which the obtuse angles are different, and the projecting wall extending at the larger obtuse angle includes a weakened tear line.

18. The package of claim 4 in which at least one end of the weakened tear line terminates in a notch in the heat-sealed periphery.

19. A package in accordance with claim 4 that contains a volume of flowable material in which the surface of the flowable material is below the lower end of the tear line at the corner of the projecting side wall when the package is placed on a horizontal surface.

* * * * *